(12) United States Patent
Kobari

(10) Patent No.: US 10,946,513 B2
(45) Date of Patent: Mar. 16, 2021

(54) ROBOT AND ROBOT SYSTEM

(71) Applicant: Seiko Epson Corporation, Tokyo (JP)

(72) Inventor: Yuki Kobari, Matsumoto (JP)

(73) Assignee: Seiko Epson Corporation

( * ) Notice: Subject to any disclaimer, the term of this patent is extended or adjusted under 35 U.S.C. 154(b) by 276 days.

(21) Appl. No.: 16/127,788

(22) Filed: Sep. 11, 2018

(65) Prior Publication Data

US 2019/0077008 A1 Mar. 14, 2019

(30) Foreign Application Priority Data

Sep. 12, 2017 (JP) .............................. JP2017-174623

(51) Int. Cl.
*B25J 9/00* (2006.01)
*B25J 19/00* (2006.01)

(52) U.S. Cl.
CPC ........... *B25J 9/0078* (2013.01); *B25J 9/0009* (2013.01); *B25J 19/0025* (2013.01)

(58) Field of Classification Search
CPC ....... B25J 9/0078; B25J 9/0009; B25J 9/0025
See application file for complete search history.

(56) References Cited

U.S. PATENT DOCUMENTS

| | | | | |
|---|---|---|---|---|
| 5,212,432 A | * | 5/1993 | Ohtani | B25J 9/046 310/56 |
| 2009/0249915 A1 | * | 10/2009 | Iwai | B25J 19/0025 74/490.02 |
| 2010/0180710 A1 | * | 7/2010 | Lee | B25J 19/0029 74/490.05 |
| 2012/0048051 A1 | * | 3/2012 | Long | B25J 19/0054 74/490.03 |
| 2012/0215356 A1 | * | 8/2012 | Igarashi | B25J 9/1694 700/258 |
| 2012/0215357 A1 | * | 8/2012 | Igarashi | B25J 9/1694 700/258 |
| 2014/0196563 A1 | * | 7/2014 | Takahashi | B25J 17/02 74/490.06 |
| 2014/0360307 A1 | * | 12/2014 | Takahashi | B25J 9/103 74/490.05 |
| 2015/0068350 A1 | * | 3/2015 | Kirihara | B25J 19/0025 74/490.05 |
| 2015/0076131 A1 | * | 3/2015 | Terada | B23K 9/12 219/137.63 |
| 2016/0008905 A1 | * | 1/2016 | Izawa | B23K 9/287 219/130.1 |

(Continued)

FOREIGN PATENT DOCUMENTS

JP 2016-078221 A 5/2016

*Primary Examiner* — David M Fenstermacher

(74) *Attorney, Agent, or Firm* — Harness, Dickey & Pierce, P.L.C.

(57) ABSTRACT

A robot comprising a base, an arm provided on the base, an actuator configured to drive the arm, a connector to which at least a part of a first wire of another device is connected, and a second wire configured to connect the actuator and the connector, wherein the base includes a cover through which the first wire is inserted, the cover covering at least a part of a hole of the base, and the cover includes a cutout for detaching the cover from the base by, in a state in which a screw fastening the cover and the base is loosened, sliding in a direction crossing a direction in which the first wire is inserted through the cover.

20 Claims, 9 Drawing Sheets

(56) References Cited

U.S. PATENT DOCUMENTS

2016/0031093 A1\* 2/2016 Tominaga ............ B25J 19/0029
74/490.01
2016/0089797 A1\* 3/2016 Kawase ................ B25J 19/005
74/490.02

\* cited by examiner

ROBOT AND ROBOT SYSTEM

BACKGROUND

1. Technical Field

The present invention relates to a robot and a robot system.

2. Related Art

Researches and developments of techniques respectively concerning a robot and a robot control device that controls the robot have been conducted.

In relation to the researches and developments, there is known a horizontal articulated robot connected to a separate robot control device by a wire (a cable) to thereby be controlled by the robot control device (JP-A-2016-78221 (Patent Literature 1)).

In such a horizontal articulated robot, a connecting section (e.g., a connector) to which the wire connecting the horizontal articulated robot and the robot control device is connected is provided on the outer side of a base of the horizontal articulated robot. In the connecting section provided on the outer side of the base, a deficiency such as deformation due to application of an unexpected shock sometime occurs. On the other hand, when the connecting section is disposed on the inner side of a base of the horizontal articulated robot, the connecting section is floating in the air. A deficiency such as disconnection of the wire connected to the connecting section sometimes occurs. In this case, an opening section connecting the outer side and the inner side of the base is formed in the base. A cover that closes the opening section is often attached. The cover is often fastened to the base by a plurality of screws. Therefore, in the horizontal articulated robot, work for detaching the cover from the base sometimes takes time.

SUMMARY

An aspect of the invention is directed to a robot including: a base; a movable section provided on the base; a driving section configured to drive the movable section; a connecting section to which at least a part of a first wire of another device is connected; and a second wire configured to connect the driving section and the connecting section. The base includes a cover section through which the first wire is inserted, the cover section covering at least a part of an opening section of the base. The cover section includes a cutout section capable of detaching the cover section from the base by, in a state in which a fastening member fastening the cover section and the base is loosened, sliding in a direction crossing a direction in which the first wire is inserted through the cover section.

With this configuration, the robot can cause a user to easily detach the cover and can prevent a deficiency from occurring in at least one of the connecting section and the second wire.

In another aspect of the invention, the robot may be configured to further include a housing section to which the connecting section is fixed and which includes the opening section.

With this configuration, the robot can prevent, with the housing section to which the connecting section is fixed and that includes the opening section, a deficiency from occurring in at least one of the connecting section and the second wire.

In another aspect of the invention, the robot may be configured such that a center axis of a fastening member fastening a ground terminal of the second wire and the housing section is located further on an outer side than an inside of the housing section.

With this configuration, the robot can prevent the fastening member fastening the ground terminal of the second wire and the housing section from coming into contact with another object on the inside of the housing.

In another aspect of the invention, the robot may be configured such that the cover section includes the cutout section capable of detaching the cover section from the base in a state in which the fastening member fastening the cover section and the base is loosened.

With this configuration, the robot can cause the user to easily detach the cover section. As a result, the robot can reduce a time required for work for detaching the cover section from the base.

In another aspect of the invention, the robot may be configured such that a first axis determined according to an insert-through hole, which is formed in the cover section and through which the first wire is inserted, and parallel to an insert-through direction in which the first wire is inserted through the cover section and a second axis determined according to the connecting section and parallel to the insert-through direction do not coincide with each other.

With this configuration, the robot can make it easy to house an excess length of the first wire in the housing section.

In another aspect of the invention, the robot may be configured such that the first axis and the second axis do not coincide with each other in a range in which the first axis moves.

With this configuration, the robot can prevent the sliding of the cover section from being hindered by a content of the housing section.

In another aspect of the invention, the robot may be configured such that the other device is a robot control device that controls the robot.

With this configuration, the robot can prevent a deficiency from occurring in at least one of the connecting section to which at least a part of the first wire of the robot control device is connected and the second wire.

Another aspect of the invention is directed to a robot system including: the robot described above; and a robot control device that controls the robot.

With this configuration, the robot system can cause the user to easily detach the cover section and can prevent a deficiency from occurring in at least one of the connecting section and the second wire.

BRIEF DESCRIPTION OF THE DRAWINGS

The invention will be described with reference to the accompanying drawings, wherein like numbers reference like elements.

DESCRIPTION OF EXEMPLARY EMBODIMENT

Embodiment

An embodiment of the invention is explained below with reference to the drawings.

Overview of a Robot

Figure 1:
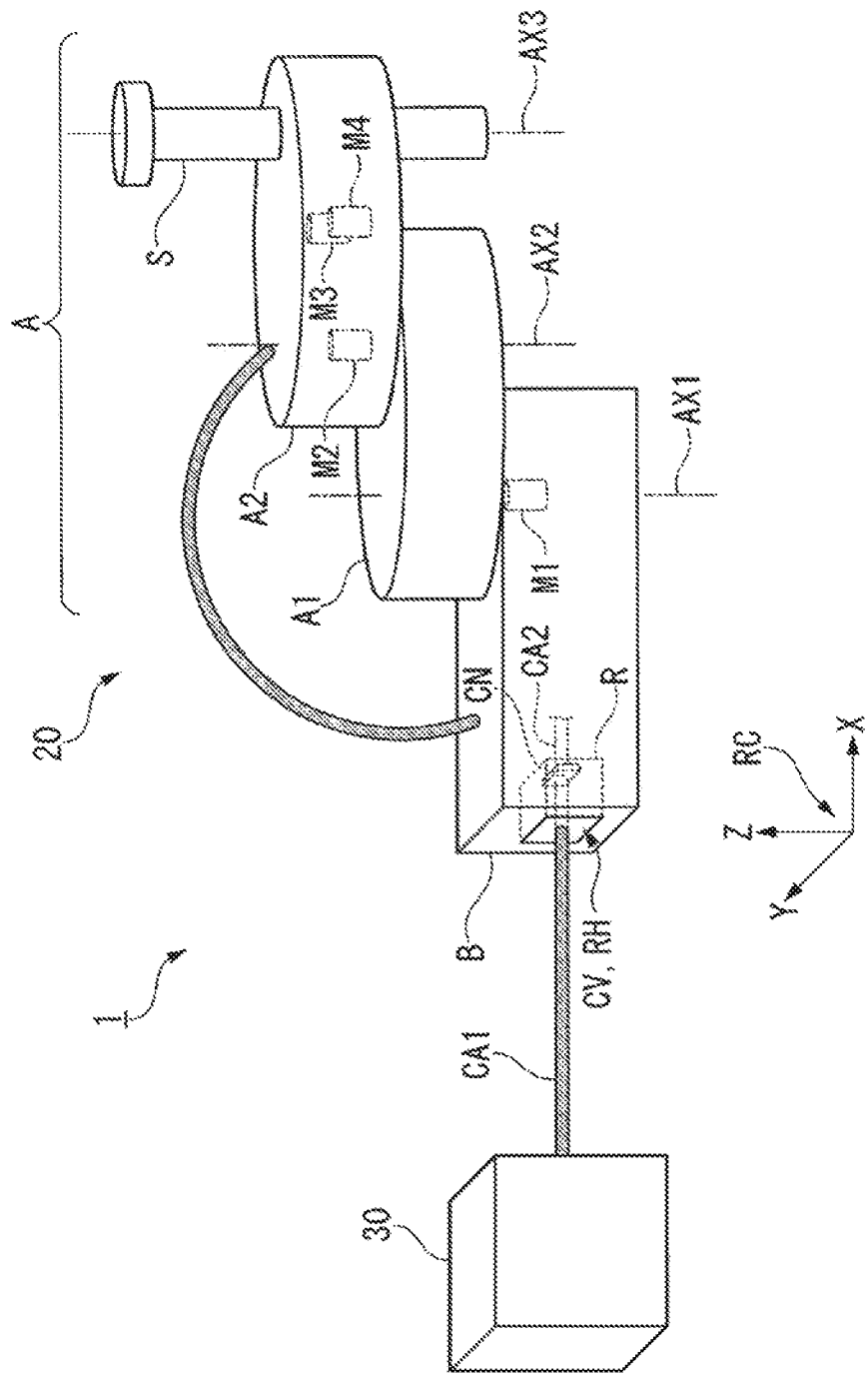
FIG. 1 is a diagram showing an example of the configuration of a robot system according to an embodiment.

FIG. 1 is a diagram showing an example of the configuration of a robot system 1 according to the embodiment.

First, an overview of a robot 20 included in the robot system 1 according to the embodiment is explained.

In a robot X (e.g., a robot in the past) different from the robot 20, a connecting section (e.g., a connector) to which a wire connecting the robot X and a robot control device 30 is connected is sometime provided on the outer side of a base of the robot X. In this case, a deficiency such as deformation due to application of an unexpected shock or the like sometimes occurs in the connecting section provided on the outer side of the base. In this case, because liquid such as water is likely to intrude between the connecting section and the wire, waterproof finish is applied to the connecting section and the wire. As a result, monetary cost related to manufacturing of the robot X sometimes increases. On the other hand, when the connecting section is disposed on the inner side of the base, the connecting section is floating in the air on the inner side of the base. A deficiency such as disconnection of the wire connected to the connecting section sometimes occurs. In this case, an opening section connecting the outer side and the inner side of the base is formed in the base. A cover closing the opening section is often attached. The cover is often fastened to the base by a plurality of screws. Therefore, in the robot X, it sometimes takes time to detach the cover from the base.

Therefore, the robot 20 includes a base, a movable section provided on the base, a driving section configured to drive the movable section, a connecting section to which at least a part of a first wire of another device is connected, and a second wire configured to connect the driving section and the connecting section. The base includes a cover section (for example, a cover) through which the first wire is inserted, the cover section covering at least a part of an opening section of the base. The cover section includes cutout sections (for example, cutouts) capable of detaching the cover section from the base by sliding in a direction crossing a direction in which the first wire is inserted through the cover section. Consequently, the robot 20 can cause a user to easily detach the cover section and can prevent a deficiency from occurring in at least one of the connecting section and the second wire. In the following explanation, a specific example of the configuration of the robot system 1 including such a configuration of the robot 20 is specifically explained. In the following explanation, as an example, the other device is the robot control device 30.

Configuration of the Robot System

The configuration of the robot system 1 is explained below.

As shown in FIG. 1, the robot system 1 includes the robot 20 and the robot control device 30.

The robot 20 is a horizontal articulated robot (a SCARA robot). Note that the robot 20 may be another robot such as a rectangular coordinate robot or a vertical articulated robot (e.g. a single arm robot or a plural arm robot) instead of the horizontal articulated robot. The rectangular coordinate robot is, for example, a gantry robot.

In an example shown in FIG. 1, the robot 20 is set on a setting surface, which is a predetermined surface. The setting surface is, for example, a floor surface of a room in which the robot 20 is set. Note that, instead of the floor surface, the setting surface may be a wall surface in the room, a ceiling surface in the room, an upper surface of a table, an upper surface of a jig, an upper surface of a table, or the like, may be an outdoor floor surface, an outdoor wall surface, or the like, or may be another surface. In the following explanation, for convenience of explanation, a direction orthogonal to the setting surface, that is, a direction from the center of gravity of the robot 20 toward the setting surface is referred to as downward or downward direction and a direction opposite to the direction is referred to as upward or upward direction. In the following explanation, as an example, the downward direction coincides with each of a negative direction of a Z axis in a robot coordinate system RC, which is a robot coordinate system of the robot 20, and the gravity direction. Note that the downward direction may not coincide with one or both of the negative direction and the gravity direction.

The robot 20 includes a base B set (fixed) not to move on the setting surface and a movable section A. The movable section A includes a first arm A1 supported turnably around a first axis AX1 by the base B, a second arm A2 supported turnably around a second axis AX2 by the first arm A1, and a shaft S supported turnably around a third axis AX3 and translatably in an axial direction of the third axis AX3 by the second arm A2.

The shaft S is a shaft body having a columnar shape. A ball screw groove and a spline groove not shown in FIG. 1 are respectively formed on the circumferential surface of the shaft S. The shaft S is provided to vertically pierce through the end portion on the opposite side of the first arm A1 of end portions of the second arm A2. In the shaft S, in this example, a flange having a disk shape having a radius larger than the radius of the column is provided at the end portion on the upper side of the end portions of the shaft S. The center axis of the column coincides with the center axis of the flange. Note that an end effector may be attachable or may be unattachable to the distal end of the shaft S, which is an end portion where the flange is not provided in the shaft S. The column and the flange may be integrated or may be separated.

In the example shown in FIG. 1, the shape of the base B is a rectangular parallelepiped. In the following explanation, for convenience of explanation, a surface in contact with the setting surface among six surfaces of the base B is referred to as lower surface of the base B. In this example, a direction along the longitudinal direction of the base B among directions parallel to the setting surface coincides with a direction along an X axis in the coordinate system RC. In the example, a direction along the latitudinal direction of the base B among the directions parallel to the setting surface coincides with a direction along a Y axis in the robot coordinate system RC. A positive direction of the Z axis in the robot coordinate system RC coincides with a direction of a vector obtained by an outer product for multiplying, from the right, a vector toward a positive direction of the X axis by a vector toward a positive direction of the Y axis. Note that the direction along the X axis may not coincide with the direction along the longitudinal direction (i.e., the direction along the Y axis may not coincide with the direction along the latitudinal direction). In the following explanation, for convenience of explanation, a surface orthogonal to the lower surface of the base B, that is, a surface on a negative direction side of the X axis in the robot coordinate system RC among the six surfaces of the base B is referred to as rear surface of the base B.

The base B incudes a housing section R (for example, a housing). In the example shown in FIG. 1, the housing section R is provided on the rear surface of the base B such that the entire housing section R is located (included) on the inner side of the base B. Note that the housing section R may be provided on a surface other than the rear surface among the six surfaces of the base B such that the entire housing section R is located on the inner side of the base B.

The housing section R is a member capable of fixing a connecting section CN explained below to the inner surface of the housing section R and is, for example, a member having a container shape. However, instead of the member, the housing section R may be a member having a frame shape or may be a member having any shape if the member can fix the connecting section CN to the inner side of the housing section R. In the example shown in FIG. 1, the housing section R is a container having a rectangular parallelepiped shape. The housing section R may be configured by one member or may be configured by a plurality of members. In this example, one surface among six surfaces of the housing section R is configured by the rear surface of the base B. Note that a part or all of the six surfaces of the housing section R may be configured by at least a part of one or more surfaces of the base B or may not be configured by the one or more surfaces of the base B. A part or the entire housing section R may not be included in the inner side of the base B. In this case, at least a part of the housing section R is provided on the outer side of the base B. In this case, for example, at least a part of the housing section R is provided on the rear surface of the base B to be located on the outer side of the base B.

On the rear surface of the base B (i.e., a surface on the negative direction side of the X axis in the robot coordinate system RC among the surfaces of the housing section R), an opening section RH, which is a hole connecting the outer side and the inner side of the housing section R, is formed. A shape of the opening section RH at the time when the base B is viewed toward the positive direction of the X axis in the robot coordinate system RC is substantially a rectangle and is a shape obtained by cutting off triangles at the respective four corners of the rectangle. Note that the shape of the opening section RH in this case may be another shape such as a circle.

The housing section R is a container to which the connecting section CN is fixed.

The connecting section CN is a connector including a first part CN1 (not shown in FIG. 1), which is a part to which a first wire CA1 is connected, and a second part CN2 (not shown in FIG. 1), which is a part to which a second wire CA2 is connected.

The first wire CA1 is a wire connecting the robot control device 30 and the robot 20. The first wire CA1 includes a power line for supplying electric power from the robot control device 30 to the driving section (i.e., an actuator explained below) included in the robot 20 and a signal line for transmitting a signal between the robot control device 30 and the driving section. Note that the first wire CA1 may include other wires in addition to the power line and the signal line.

The second wire CA2 is a wire that connects the driving section included in the robot 20 and the connecting section CN.

The first wire CA1 is connected to the first part CN1 (not shown in FIG. 1; see, for example, FIG. 3) of the connecting section CN and the second wire CA2 is connected to the second part CN2 (not shown in FIG. 1; see, for example, FIG. 3) of the connecting section CN, whereby the first wire CA1 is connected to the driving section via the connecting section CN and the second wire CA2. That is, the robot control device 30 is connected to the driving section via the first wire CA1, the connecting section CN, and the second wire CA2.

Note that the connecting section CN may be another connecting member instead of the connector. The connecting section CN may be a connector to which a part (e.g., one of the power line and the signal line explained above, a part of the power line, or a part of the signal line) of the first wire CA1 is connected. The connecting section CN may be a connector to which a part (a wire corresponding to the first wire CA1) of the second wire CA2 is connected.

A surface to which the connecting section CN is fixed among the surfaces of the housing section R is a surface on the positive direction side of the X axis in the robot coordinate system RC among the surfaces of the housing section R. Note that the surface to which the connecting section CN is fixed among the surfaces of the housing section R may be another surface of the housing section R instead of the surface on the positive direction side.

The base B includes a cover section CV through which the first wire CA1 is inserted. The cover section CV covers at least a part of the opening section RH. In the following explanation, as an example, the cover section CV is a tabular member that covers the entire opening section RH and in which an insert-through hole CH (not shown in FIG. 1; see, for example, FIG. 4) through which the first wire CA1 is inserted is formed. Note that the cover section CV may be a member having another shape instead of the tabular member in which the insert-through hole CH is formed. The cover section CV is fastened (fixed) to the base B by one or more fastening members SC (not shown in FIG. 1; see, for example, FIG. 4). In the following explanation, as an example, the cover section CV is fastened (fixed) to the base B by four fastening members SC. The fastening members SC are, for example, screws that the user can tighten or loosen using a tool such as a screw driver. Note that, instead of the screws, the fastening members SC may be other fastening members capable of fixing the cover section CV to the base B by fastening the cover section CV such as screws that the user can tighten or loosen with a hand.

The housing section R and the cover section CV are explained with reference to FIGS. 2 to 7. Note that, in FIGS. 2 to 7, to avoid complication of the figures, the first wire CA1, the movable section A, and a part of the second wire CA2 are respectively omitted.

Figure 2:
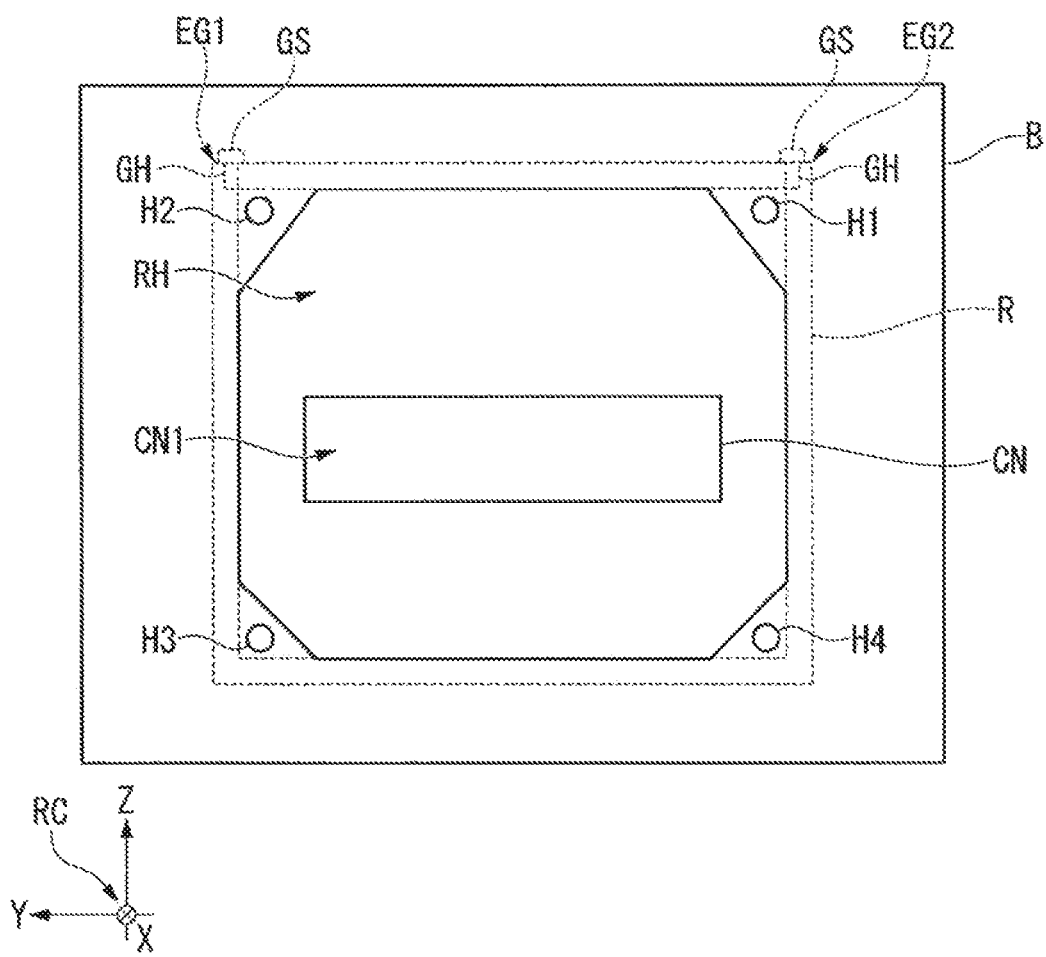
FIG. 2 is a diagram of an example of a base in a detached state of a cover section, the example being viewed toward a positive direction of an X axis in a robot coordinate system.

FIG. 2 is a diagram of an example of the base B in a detached state of the cover section CV, the example being viewed toward the positive direction of the X axis in the robot coordinate system RC.

In the example shown in FIG. 2, as explained above, the shape of the opening section RH formed on the rear surface of the base B (i.e., the opening section RH formed in the housing section R) is substantially a rectangle and is a shape obtained by cutting off triangles at the respective four corners in the rectangle. Screw holes are respectively formed on surfaces corresponding to the four corners in the rear surface. In this example, threads are cut in the screw holes. The fastening members SC, which are the screws in this example, are fastened to the screw holes. A screw hole H1 shown in FIG. 2 is an example of a screw hole formed at a corner on a fourth quadrant side in a YZ plane in the robot coordinate system RC among the four corners. A screw hole H2 shown in FIG. 2 is an example of a screw hole formed at a corner on a first quadrant side in the YZ plane among the four corners. A screw hole H3 shown in FIG. 2 is an example of a screw hole formed at a corner on a second quadrant side in the YZ plane among the four corners. A screw hole H4 shown in FIG. 2 is an example of a screw hole formed at a corner on a third quadrant side in the YZ plane among the four corners.

In the example shown in FIG. 2, because the cover section CV is not attached to the base B, it can be confirmed that the first part CN1 of the connecting section CN fixed to the housing section R is located on the inner side of the housing section R through the opening section RH.

In at least one of a first upper part EG1, which is an upper part of a surface on the positive direction side of the Y axis in the robot coordinate system RC among the surfaces of the housing section R, and a second upper part EG2, which is an upper part of a surface on the negative direction side of the Y axis in the robot coordinate system RC among the surfaces of the housing section R, one or more screw holes GH for fastening fastening members GS that fasten a ground terminal GE (not shown in FIG. 2; see, for example, FIG. 3) included in the second wire CA2 and the housing section R are formed. In the following explanation, as an example, one screw hole GH is formed in the first upper part EG1 and one screw hole GH is formed in the second upper part EG2. In the example shown in FIG. 2, the fastening member GS is fastened to each of these two screw holes GH. In each of the first upper part EG1 and the second upper part EG2, the screw hole GH is formed such that the center axis of the fastening member GS is located further on the outer side than the inside of the housing section R when the fastening member GS is fastened to the screw hole GH and when the housing section R is viewed toward the positive direction of the X axis in the robot coordinate system RC. Consequently, the robot 20 can prevent the fastening member GS from coming into contact with another object (e.g., a hand of the user performing work on the inside or a part of the first wire CA1) on the inside of the housing section R. Note that, in each of the first upper part EG1 and the second upper part EG2, the screw hole GH may be formed such that a threaded portion of the fastening member GS is located further on the outer side than the inside of the housing section R when the fastening member GS is fastened to the screw hole GH and when the housing section R is viewed toward the positive direction of the X axis in the robot coordinate system RC.

Figure 3:
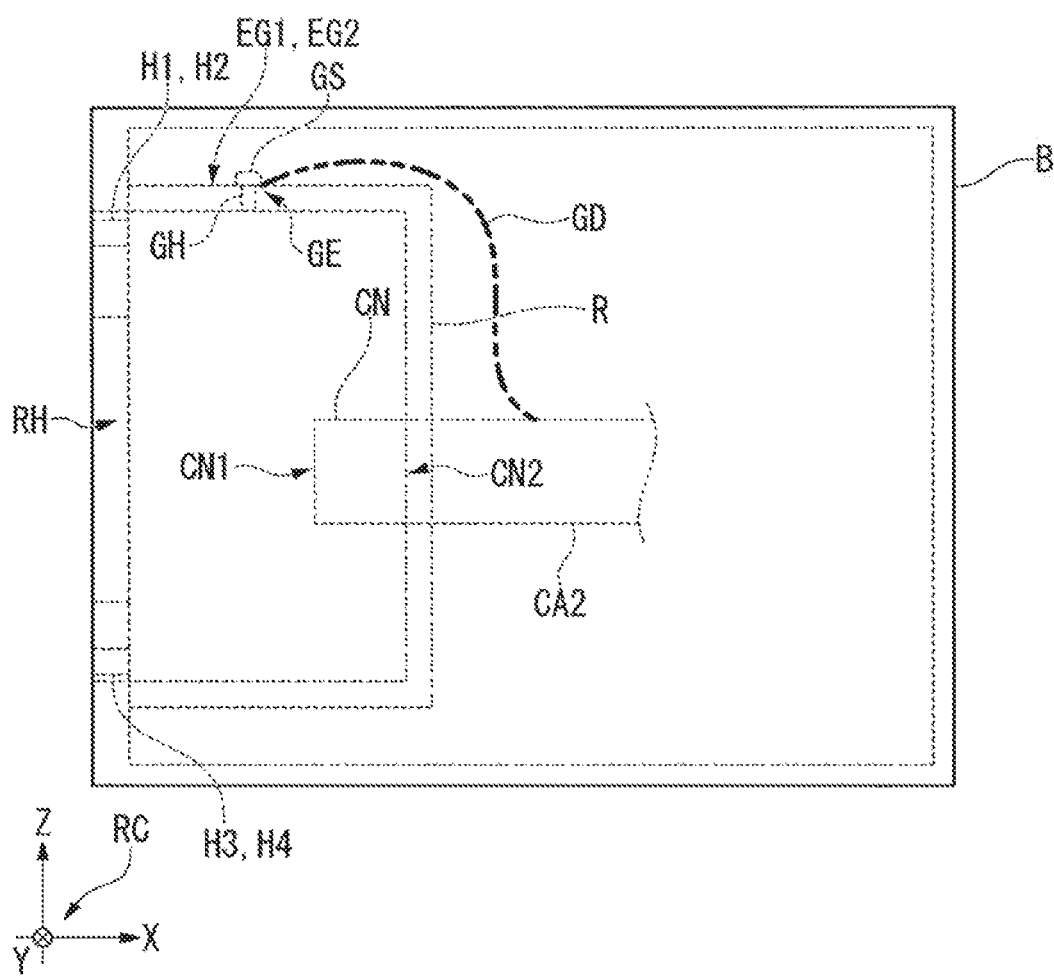
FIG. 3 is a diagram of the example of the base in the detached state of the cover section, the example being viewed toward a positive direction of a Y axis in the robot coordinate system.

FIG. 3 is a diagram of the example of the base B in the detached state of the cover section CV, the example being viewed toward the positive direction of the Y axis in the robot coordinate system RC. In the example shown in FIG. 3, the connecting section CN is fixed to the housing section R such that the first part CN1 is disposed on the inner side of the housing section R and the second part CN2 is disposed on the outer side of the housing section R. Note that the connecting section CN may be fixed to the housing section R such that both of the first part CN1 and the second part CN2 are disposed on the inner side of the housing section R. The connecting section CN may be fixed to the housing section R such that both of the first part CN1 and the second part CN2 are disposed on the outer side of the housing section R.

A cable GD shown in FIG. 3 is a cable that connects a shield covering the circumferential surface of the second wire CA2 and the ground terminal GE. In the example shown in FIG. 3, the ground terminal GE is fastened to the housing section R by the fastening member GS. Consequently, the robot 20 can prevent noise that occurs in the second wire CA2.

Figure 4:
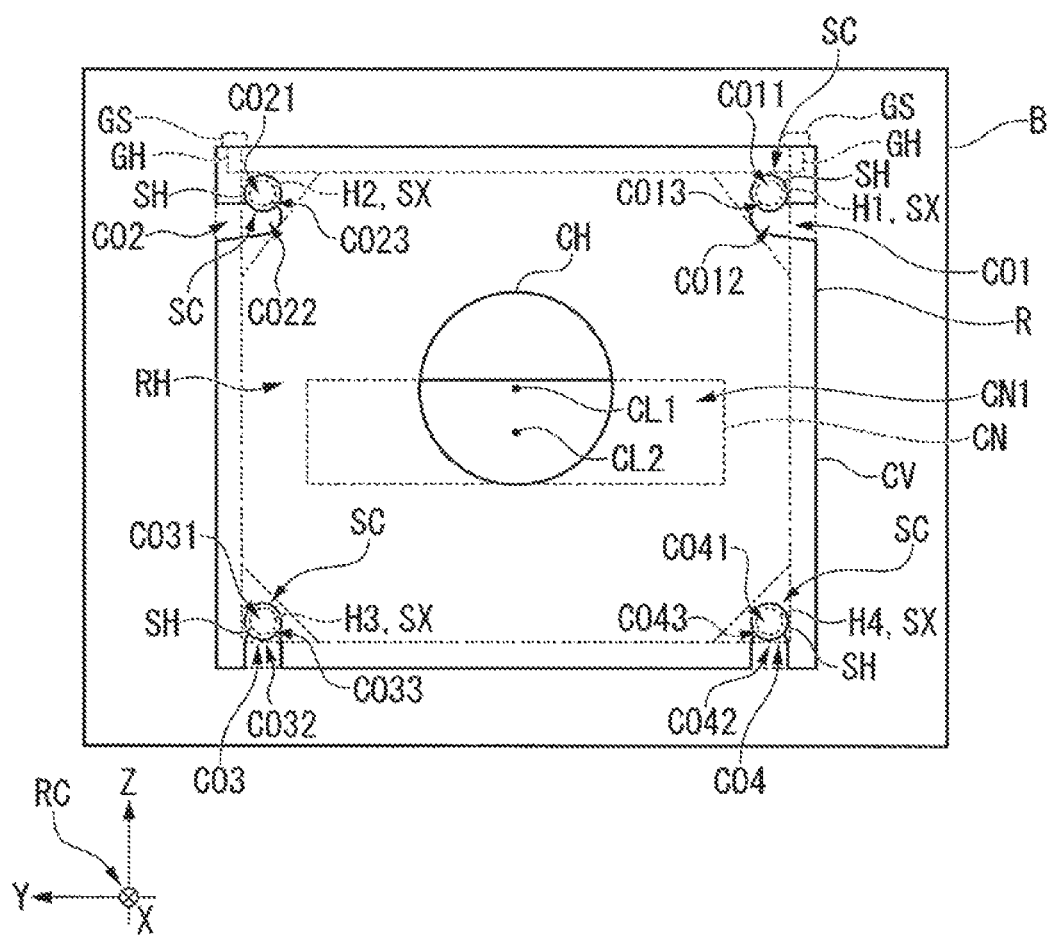
FIG. 4 is a diagram of an example of the base in a fastened state of the cover section fastened by fastening members, the example being viewed toward the positive direction of the X axis in the robot coordinate system.

FIG. 4 is a diagram of an example of the base B in a fastened state of the cover section CV fastened to the base B by the fastening members SC, the example being viewed toward the positive direction of the X axis in the robot coordinate system RC. In the following explanation, for convenience of explanation, a relative positional relation between the cover section CV and the housing section R in the state is referred to as first positional relation. That is, FIG. 4 is a diagram showing each of the cover section CV and the housing section R at the time the relative positional relation between the cover section CV and the housing section R coincides with the first positional relation.

In the example shown in FIG. 4, as explained above, the cover section CV is fastened to the base B by the fastening members SC respectively fastened to the screw holes H1 to H4. That is, the cover section CV and the base B are fastened (fixed) by the fastening members SC. More specifically, the relative positional relation between the cover section CV and the housing section R is fixed by the fastening members SC.

The cover section CV includes cutout sections capable of detaching the cover section CV from the housing section R in a state in which the fastening members SC that fix the relative positional relation of the cover section CV and the housing section R are loosened. A cutout section CO1 shown in FIG. 4 is an example of a cutout section corresponding to the screw hole H1 among the cutout sections capable of detaching the cover section CV from the base B. A cutout section CO2 shown in FIG. 4 is an example of a cutout section corresponding to the screw hole H2 among the cutout sections capable of detaching the cover section CV from the base B. A cutout section CO3 shown in FIG. 4 is an example of a cutout section corresponding to the screw hole H3 among the cutout sections capable of detaching the cover section CV from the base B. A cutout section CO4 shown in FIG. 4 is an example of a cutout section corresponding to the screw hole H4 among the cutout sections capable of detaching the cover section CV from the base B.

The cutout section CO1 includes a first hole CO11, a second hole CO12, and a third hole CO13. That is, the cutout section CO1 is formed in the cover section CV to be a structure obtained by combining the first hole CO11, the second hole CO12, and the third hole CO13.

The first hole CO11 is a hole having a radius larger than the radius of a shaft section SX of the fastening member SC and smaller than the radius of a screw head SH of the fastening member SC. The shaft section SX is a part where a screw thread is formed among parts of the fastening member SC. The screw head SH is a part into which a tool such as a screw driver is inserted when the fastening member SC is rotated. The first hole CO11 is a hole that overlaps (coincides with) the screw hole H1 when the base B is viewed toward the positive direction of the X axis in the robot coordinate system RC and when the relative positional relation between the cover section CV and the housing section R coincides with the first positional relation.

The second hole CO12 is a hole having a radius larger than the radius of the screw head SH of the fastening member SC. The center of the second hole CO12 is a hole that coincides with the center of the screw hole H1 when the base B is viewed toward the positive direction of the X axis in the robot coordinate system RC and when the relative positional relation between the cover section CV and the housing section R coincides with a predetermined second positional relation. That is, in this case, the second hole CO12 and the screw hole H1 are concentric circles. The second positional relation is a relative positional relation between the cover section CV and the housing section R at the time when the cover section CV is detached from the base B. In this example, the second positional relation is a relative positional relation between the cover section CV and the housing section R at the time when the cover section CV is slid a predetermined distance in a first direction, which is a direction crossing a direction in which the first wire CA1 is inserted through the cover section CV, from a state in which the relative positional relation between the cover section CV and the housing section R coincides with the first positional relation. In the example shown in FIG. 4, the first direction is the positive direction of the Z axis in the robot coordinate system RC. Note that the first direction may be another direction crossing the direction in which the first wire CA1 is inserted through the cover section CV. In this example, the predetermined distance is the distance between the center of the first hole CO11 and the center of the second hole CO12. Note that the predetermined distance may be another distance instead of this distance.

The third hole CO13 is a hole connecting the first hole CO11 and the second hole CO12. The third hole CO13 is a hole (a groove) for allowing the shaft section SX of the fastening member SC to pass from the first hole CO11 to the second hole CO12 when, in a state in which the fastening member SC is loosened without being detached from the housing section R, the cover section CV is slid the predetermined distance in the first direction and the relative positional relation between the cover section CV and the housing section R is changed from the first positional relation to the second positional relation. Therefore, the width of the third hole CO13 is larger than the diameter of the shaft section SX. In the following explanation, as an example, the width of the third hole CO13 is the same as the diameter of the first hole CO11. Because the cutout section CO1 includes the third hole CO13, the user can slide the cover section CV the predetermined distance in the first direction. As a result, the user can detach the cover section CV from the base B without detaching the fastening members SC from the base B in a state in which the fastening members SC are loosened.

In the example shown in FIG. 4, the cutout section CO1 includes a groove, which has a width larger than the diameter of the screw head SH, from the second hole CO12 toward the positive direction of the Y axis in the robot coordinate system RC. Note that the cutout section CO1 may not include the groove.

The structure of the cutout section CO2 is the same as a structure obtained by reversing the left and the right of the cutout section CO1 when the positive direction of the Y axis in the robot coordinate system RC is set as the left and the negative direction of the Y axis is set as the right. Therefore, detailed explanation of the structure of the cutout section CO2 is omitted. In the example shown in FIG. 4, the cutout section CO2 includes a first hole CO21 as a first hole corresponding to the first hole CO11 of the cutout section CO1. In this example, the cutout section CO2 includes a second hole CO22 as a second hole corresponding to the second hole CO12 of the cutout section CO1. In this example, the cutout section CO2 includes a third hole CO23 as a third hole corresponding to the third hole CO13 of the cutout section CO1. Note that the structure of the cutout section CO2 may be a structure different from the structure obtained by reversing the left and the right of the cutout section CO1.

The cutout section CO3 includes a first hole CO31, a second hole CO32, and a third hole CO33. That is, the cutout section CO3 is formed in the cover section CV to be a structure obtained by combining the first hole CO31, the second hole CO32, and the third hole CO33.

The first hole CO31 is a hole having a radius larger than the radius of the shaft section SX of the fastening member SC and smaller than the radius of the screw head SH of the fastening member SC. The first hole CO31 is a hole that overlaps (coincides with) the screw hole H3 when the base B is viewed toward the positive direction of the X axis in the robot coordinate system RC and when the relative positional relation between the cover section CV and the housing section R coincides with the first positional relation.

The second hole CO32 is a hole having a radius larger than the radius of the screw head SH of the fastening member SC. The center of the second hole CO32 is a hole that coincides with the center of the screw hole H3 when the base B is viewed toward the positive direction and when the relative positional relation between the cover section CV and the housing section R coincides with the predetermined second positional relation. That is, in this case, the second hole CO32 and the screw hole H3 are concentric circles.

The third hole CO33 is a hole connecting the first hole CO31 and the second hole CO32. The third hole CO33 is a hole (a groove) for allowing the shaft section SX of the fastening member SC to pass from the first hole CO31 to the second hole CO32 when, in a state in which the fastening member SC is loosened without being detached from the housing section R, the cover section CV is slid the predetermined distance in the first direction and the relative positional relation between the cover section CV and the housing section R is changed from the first positional relation to the second positional relation. Therefore, the width of the third hole CO33 is larger than the diameter of the shaft section SX. In the following explanation, as an example, the width of the third hole CO33 is the same as the diameter of the first hole CO31. Because the cutout section CO3 includes the third hole CO33, the user can slide the cover section CV the predetermined distance in the first direction. As a result, the user can detach the cover section CV from the base B without detaching the fastening members SC from the base B in a state in which the fastening members SC are loosened.

In the example shown in FIG. 4, the cutout section CO3 includes a groove, which has a width larger than the diameter of the screw head SH, from the second hole CO32 toward the negative direction of the Z axis in the robot coordinate system RC. Note that the cutout section CO3 may not include the groove.

In this example, the structure of the cutout section CO4 is the same as the structure of the cutout section CO3. Therefore, detailed explanation of the structure of the cutout section CO4 is omitted. In the example shown in FIG. 4, the cutout section CO4 includes a first hole CO41 as a first hole corresponding to the first hole CO31 of the cutout section CO3. In this example, the cutout section CO4 includes a second hole CO42 as a second hole corresponding to the second hole CO32 of the cutout section CO3. In this example, the cutout section CO4 includes a third hole CO43 as a third hole corresponding to the third hole CO33 of the cutout section CO3. Note that the structure of the cutout section CO4 may be a structure different from the structure of the cutout section CO3.

Figure 5:
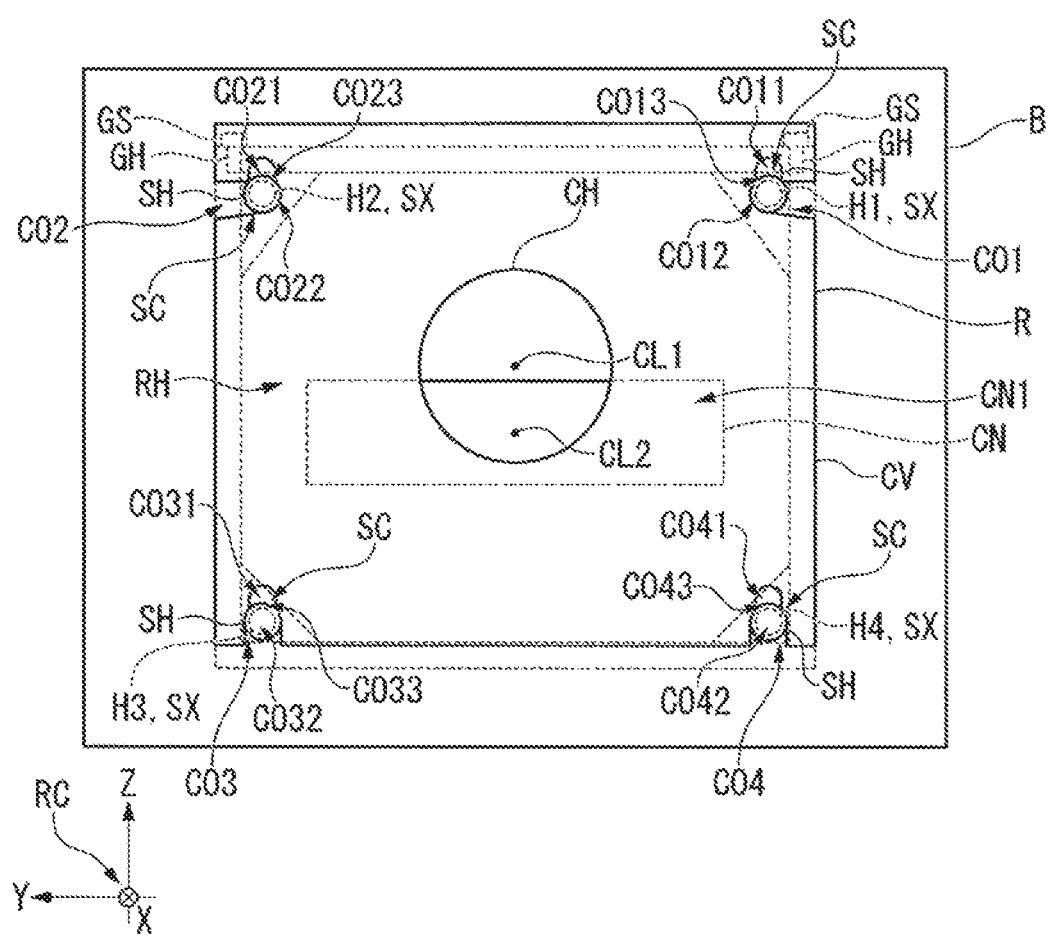
FIG. 5 is a diagram showing an example of a relative positional relation between the cover section and a housing section at the time when the cover section shown in FIG. 4 is slid a predetermined distance in a first direction.

FIG. 5 is a diagram showing an example of a relative positional relation between the cover section CV and the housing section R at the time when the cover section CV shown in FIG. 4 is slid the predetermined distance in the first direction. As shown in FIG. 5, in this case, the relative positional relation between the cover section CV and the housing section R coincides with the second positional relation. Therefore, the second hole CO12 and the screw hole H1 are concentric circles. The second hole CO22 and the screw hole H2 are concentric circles. The second hole CO32 and the crew hole H3 are concentric circles. The second hole CO42 and the screw hole H4 are concentric circles. In this case, the respective radiuses of the second hole CO12, the second hole CO22, the second hole CO32, and the second hole CO42 are larger than the radius of the screw head SH. Therefore, by moving the cover section CV in the negative direction of the X axis in the robot coordinate system RC, the user can detach the cover section CV from the base B in the state in which the fastening members SC are loosened and the fastening members SC are not detached from the housing section R. As a result, the robot 20 can reduce a time required for work for detaching the cover section CV from the base B.

Note that FIG. 4 is only an image diagram. Therefore, when the cover section CV shown in FIG. 4 is slid the predetermined distance in the first direction, the center of the screw hole H1 and the center of the second hole CO12 are sometimes seen not coinciding with each other. In this case, the center of the screw hole H2 and the center of the second hole CO22 are sometimes seen not coinciding with each other. In this case, the center of the screw hole H3 and the center of the second hole CO32 are sometimes seen not coinciding with each other. In this case, the center of the screw hole H4 and the center of the second hole CO42 are sometimes seen not coinciding with each other.

Figure 6:
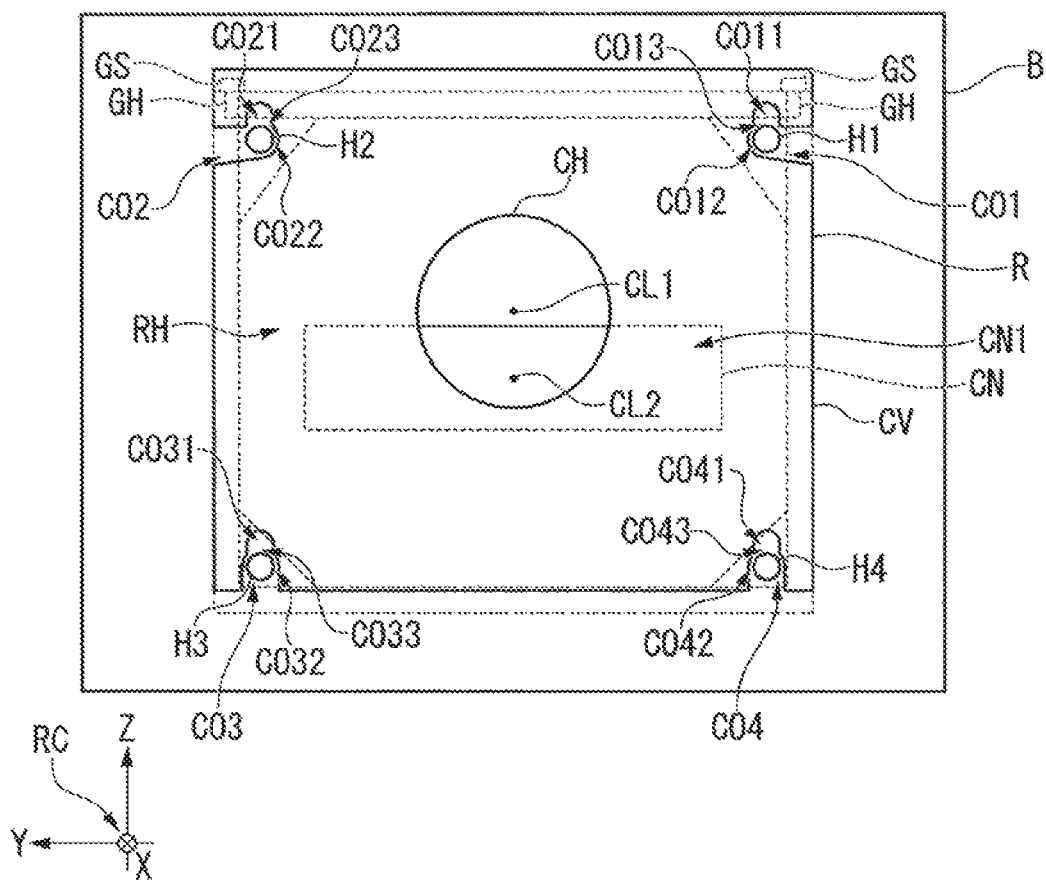
FIG. 6 is a diagram showing an example of a state in which the fastening members are detached from the cover section and the base in the base shown in FIG. 4.

FIG. 6 is a diagram showing an example of a state in which the fastening members SC are detached from the cover section CV and the base B in the base B shown in FIG. 4. As shown in FIG. 6, when the base B is viewed toward the positive direction of the X axis in the robot coordinate system RC, in this state, the first hole CO11 of the cutout section CO1 and the screw hole H1 overlap. In this case, in the state, the first hole CO21 of the cutout section CO2 and the screw hole H2 overlap. In this case, in the state, the first hole CO31 of the cutout section CO3 and the screw hole H3 overlap. In this case, in the state, the first hole CO41 of the cutout section CO4 and the screw hole H4 overlap.

Referring back to FIG. 4, as explained above, the insert-through hole CH through which the first wire CA1 is inserted is formed in the cover section CV. More specifically, in the cover section CV, the insert-through hole CH is formed to prevent a first axis CL1 and a second axis CL2 from coinciding with each other in a range in which the first axis CL1 moves when the relative positional relation between the cover section CV and the housing section R changes between the first positional relation and the second positional relation.

The first axis CL1 is an axis determined according to the insert-through hole CH. In the following explanation, as an example, the first axis CL1 is an axis passing the center of the insert-through hole CH. The first axis CL1 is an axis parallel to an insert-through direction, which is a direction in which the first wire CA1 is inserted through the cover section CV. In the following explanation, as an example, the insert-through direction is a direction along the X axis in the robot coordinate system RC.

The second axis CL2 is an axis determined according to the connecting section CN. In the following explanation, as an example, the second axis CL2 is an axis passing the center of a figure (in the example shown in FIG. 4, a rectangle) representing the contour of the connecting section CN when the connecting section CN is viewed toward the positive direction of the X axis in the robot coordinate system RC. The second axis CL2 is an axis parallel to the insert-through direction, which is the direction in which the first wire CA1 is inserted through the cover section CV.

Note that one or both of the first axis CL1 and the second axis CL2 may be an axis unparallel to the insert-through direction, which is the direction in which the first wire CA1 is inserted through the cover section CV.

Figure 7:
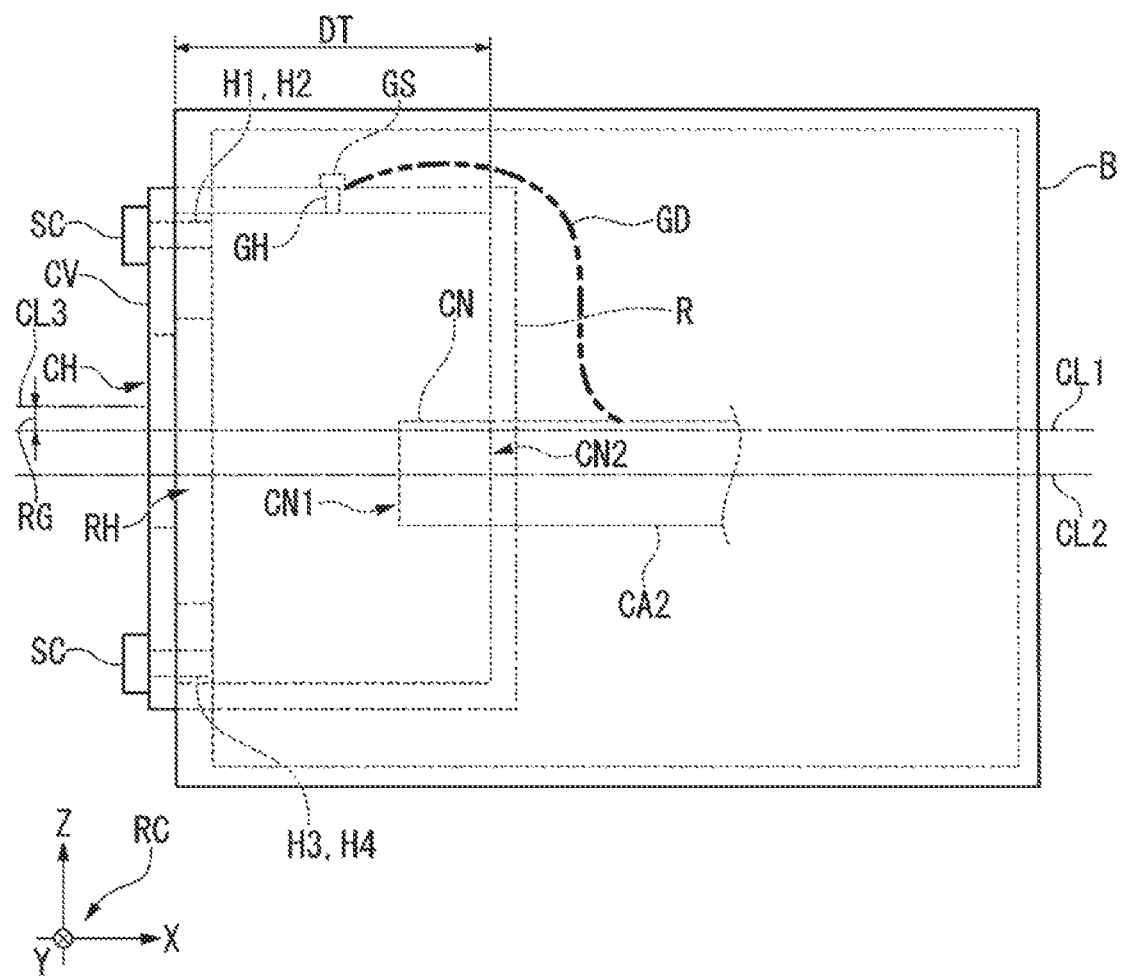
FIG. 7 is a side view of the base shown in FIG. 4 viewed toward the positive direction of the Y axis in the robot coordinate system.

FIG. 7 is a side view of the base B shown in FIG. 4 viewed toward the positive direction of the Y axis in the robot coordinate system RC. Note that, in FIG. 7, to avoid complication of the figure, the respective cutout sections CO1 to CO4 included in the cover section CV are omitted. An auxiliary line CL3 shown in FIG. 7 indicates the position of the first axis CL1 at the time when the relative positional relation between the cover section CV and the housing section R coincides with the second positional relation. That is, the range in which the first axis CL1 moves when the relative positional relation between the cover section CV and the housing section R changes between the first positional relation and the second positional relation is a range RG shown in FIG. 7. As shown in FIG. 7, the second axis CL2 is not included in the range RG. Therefore, it is seen from this as well that the insert-through hole CH is formed in the cover section CV to prevent the first axis CL1 and the second axis CL2 from coinciding with each other within the range in which the first axis CL1 moves when the relative positional relation between the cover section CV and the housing section R changes between the first positional relation and the second positional relation.

In this way, the insert-through hole CH is formed in the cover section CV to prevent the first axis CL1 and the second axis CL2 from coinciding with each other within the range in which the first axis CL1 moves when the relative positional relation between the cover section CV and the housing section R changes between the first positional relation and the second positional relation. Therefore, the robot 20 can make it easy to house an excess length of the first wire CA1 in the housing section R. The robot 20 can prevent the sliding of the cover section CV in the first direction from being hindered by a content of the housing section R.

The depth of the housing section R is explained with reference to FIG. 7. A depth DT of the housing section R shown in FIG. 7 is desirably approximately 20 to 40 millimeters and is, for example, approximately 30 millimeters. This is because, if the depth DT is too large, a hand of the user does not reach the inner part of the housing section R and, if the depth DT is too small, the connecting section CN interferes with the rear surface of the base B and the cover section CV. The depth DT shown in FIG. 7 is length along the X-axis direction in the robot coordinate system RC and is length from the lower surface of the cover section CV to the bottom surface of the housing section R at the time when the cover section CV is fastened to the base B. The lower surface of the cover section CV is a surface on the housing section R side among surfaces of the cover section CV in this case. The bottom surface of the housing section R is a surface opposed to the cover section CV among surfaces on the inner side of the housing section R in this case. Note that the depth DT may be smaller than 20 millimeters if the connecting section CN does not interfere with the rear surface of the base B and the cover section CV. The depth DT may be larger than 40 millimeters, for example, when the size of the opening section RH is larger than the hand of the user or when the robot 20 causes the user to use a tool for connecting the first wire CA1 to the connecting section CN.

Figure 8:
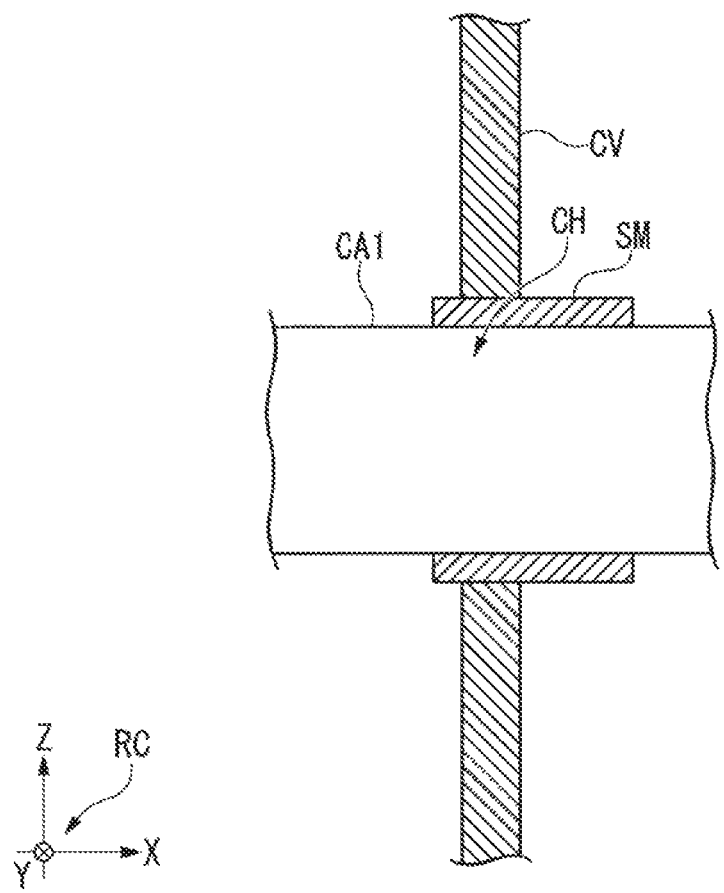
FIG. 8 is a diagram showing an example of the cover section shown in FIG. 4 through which a first wire is inserted.

The first wire CA1 and the cover section CV are explained with reference to FIG. 8. FIG. 8 is a diagram showing an example of the cover section CV shown in FIG. 4 through which the first wire CA1 is inserted. FIG. 8 is a sectional view of the cover section CV, through which the first wire CA1 is inserted, taken along a surface passing the center of the insert-through hole CH formed in the cover section CV and parallel to a ZX plane in the robot coordinate system RC. Note that, to avoid complication of the figure, a cross section of the first wire CA1 shown in FIG. 8 is indicated by a white blank. As shown in FIG. 8, the first wire CA1 is inserted through the insert-through hole CH formed in the cover section CV. In this case, as shown in FIG. 8, a seal member SM is provided between the first wire CA1 and the cover section CV. The seal member SM may be any member if the member prevents foreign matters (e.g., liquid, particulates, or gas) from intruding into the inner side of the housing section R from a space between the first wire CA1 and the cover section CV. The material of the seal member SM is, for example, resin. However, the material of the seal member SM may be another material instead of the resin. Note that the seal member SM may not be provided between the first wire CA1 and the cover section CV. The seal member SM is an example of the first seal member.

Figure 9:
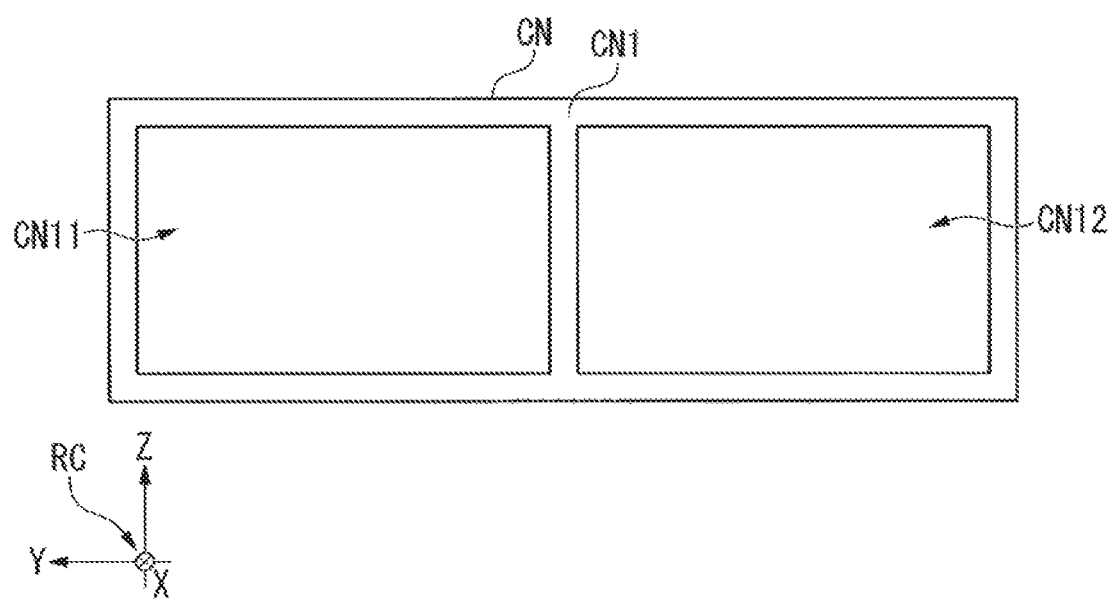
FIG. 9 is a diagram showing an example of a first part of a connecting section shown in FIG. 4.

The first part CN1 of the connecting section CN is explained with reference to FIG. 9. FIG. 9 is a diagram showing an example of the first part CN1 of the connecting section CN shown in FIG. 4. As shown in FIG. 9, a first connecting section CN11 and a second connecting section CN12 are provided in the first part CN1. The first connecting section CN11 is a connector to which the power line explained above is connected. The second connecting section CN12 is a connector to which the signal line explained above is connected. Consequently, the robot 20 can prevent a deficiency from occurring in a part or all of the first connecting section CN11, the second connecting section CN12, and the second wire CA2. The user can prevent the user from erroneously connecting the signal line to a part to which the power line is connected and can prevent the user from erroneously connecting the power line to a part to which the signal line is connected. Note that only one of the first connecting section CN11 and the second connecting section CN12 may be provided in the first part CN1. Other connectors may be provided instead of one or both of the first connecting section CN11 and the second connecting section CN12. Other connectors may be provided in addition to one or both of the first connecting section CN11 and the second connecting section CN12. The first connecting section CN11 and the second connecting section CN12 may collectively configure one connector.

As explained above, the first part CN1 of the connecting section CN and the first wire CA1 are housed on the inner side of the housing section R. Therefore, it is unnecessary to apply, between the first part CN1 and the first wire CA1, processing for preventing foreign matters from intruding such as waterproof finish. As a result, a manufacturer of the robot 20 can manufacture the robot 20 using an inexpensive connector as the connecting section CN and can manufacture the robot 20 using an inexpensive wire as the first wire CA1. That is, the robot 20 can prevent an increase in monetary cost related to the manufacturing of the robot 20.

Note that, when the connecting section CN fixed to the housing section R is configured by a plurality of connectors, a part or all of the plurality of connectors may have shapes different from one another or may have the same shape one another. When all of the plurality of connectors have shapes different from one another, the robot 20 can prevent erroneous connection of the wires by the user.

Because the connecting section CN is fixed to the housing section R, when work for detaching the first wire CA1 from the connecting section CN is performed, the connecting section CN is not taken out from the inner side of the base B to the outer side of the base B. Therefore, the second wire CA2 connected to the second part CN2 of the connecting section CN on the outer side of the housing section R on the inner side of the base B can be reduced by an excess length for taking out the connecting section CN from the inner side of the base B to the outer side of the base B. As a result, the robot 20 can prevent occurrence of noise in the second wire CA2.

Referring back to FIG. 1, the driving section explained above included in the robot 20 drives the movable section A. In this example, the driving section is each of a first driving section M1, a second driving section M2, a third driving section M3, and a fourth driving section M4. Note that the driving section may be a component including other driving sections instead of a part or all of these four driving sections or may be a component including other driving sections in addition to all of the four driving sections.

The base B includes the first driving section M1, which is a driving section configured to turn the first arm A1 around the first axis AX1. The first driving section M1 is an actuator controlled by the robot control device 30. That is, the first axis AX1 is an axis coinciding with a turning axis of the first driving section M1.

The first arm A1 turns around the first axis AX1 according to the turning of the turning axis of the first driving section M1 and moves in the horizontal direction. In this example, the horizontal direction is a direction orthogonal the up-down direction. That is, in this example, the horizontal direction is a direction along an XY plane in the robot coordinate system RC of the robot 20.

The second arm A2 turns around the second axis AX2 and moves in the horizontal direction. The second arm A2 includes the second driving section M2, which is a driving section configured to turn the second arm A2 around the second axis AX2 with respect to the first arm A1. The second driving section M2 is an actuator controlled by the robot control device 30. That is, the second axis AX2 is an axis coinciding with a turning axis of the second driving section M2.

The second arm A2 includes the third driving section M3, which is an up-down motion actuator, and the fourth driving section M4, which is a turning actuator, and supports the shaft S. The third driving section M3 turns, with a not-shown timing belt or the like, a ball screw nut provided in the outer circumferential portion of the ball screw groove of the shaft S to thereby move (lift or lower) the shaft S in the up-down direction. The fourth driving section M4 turns, with the not-shown timing belt or the like, a ball spline nut provided in the outer circumferential portion of the spline groove of the shaft S to thereby turn the shaft S around the center axis of the shaft S.

Each of the first to fourth driving sections M1 to M4, which are the four driving sections included in the robot 20, is communicably connected to the robot control device 30 by the first wire CA1. The first wire CA1 includes a power line for supplying electric power from the robot control device 30 to each of the four driving sections and a signal line for transmitting a signal between the robot control device 30 and each of the four driving sections. Consequently, each of the four driving sections performs operation based on a control signal acquired from the robot control device 30. Note that wired communication via the signal line is performed according to a standard such as an Ethernet (registered trademark) or a USB (Universal Serial Bus). A part of the four driving sections may be connected to the robot control device 30 by wireless communication performed according to a communication standard such as a Wi-Fi (registered trademark). The first wire CA1 may include other wires in addition to the power line and the signal line.

The robot control device 30 operates the robot 20 by transmitting a control signal to the robot 20. Consequently, the robot control device 30 can cause the robot 20 to perform predetermined work. The robot control device 30 is separate from the robot 20 and is set on the outside of the robot 20.

Note that the first wire CA1 connected to the connecting section CN may be a wire connected from another device different from the robot control device 30 to the robot 20 instead of the wire connected from the robot control device 30 to the robot 20. The other device is, for example, a teaching pendant or a notebook PC (Personal Computer) connected to the robot 20.

In FIGS. 1 and 8, the first wire CA1 including the power line and the signal line is drawn as one integrated wire. However, this is only an example. The first wire CA1 may be configured by two or more wires. In this case, for example, power lines are integrated as one wire and signal lines are integrated as one wire. In this case, the insert-through hole CH through which the first wire CA1 configured by two or more wires is inserted may include insert-through holes respectively corresponding to the two or more wires. All of the two or more wires may be inserted through the insert-through hole CH.

Each of the cutout sections CO1 to CO4 included in the cover section CV can be formed in the cover section CV by, for example, cutting out a screw through-hole to which the ground of the first wire CA1 is fixed.

The first wire CA1 is connected to, for example, the first part CN1 of the connecting section CN by, for example, a panel-mounted connector of a one-touch type. In this case, the user can easily detach the first wire CA1 from the connecting section CN with a hand. Note that the first wire CA1 may be connected to the connecting section CN by another connector.

The base B explained above may not include the housing section R. In this case, the base B includes some member to which the connecting section CN is fixed.

In the housing section R explained above, in each of the first upper part EG1 and the second upper part EG2, the screw hole GH may be formed such that the center axis of the fastening member GS is located on the inside of the housing section R when the fastening member GS is fastened to the screw hole GH and when the housing section R is viewed toward the positive direction of the X axis in the robot coordinate system RC.

Each of the cutout sections CO1 to CO4 explained above may be a groove formed in the cover section CV rather than the cutout.

In the cover section CV explained above, the insert-through hole CH may be formed such that the first axis CL1 and the second axis CL2 coincide with each other in a range in which the first axis CL1 moves when the relative positional relation between the cover section CV and the housing section R changes between the first positional relation and the second positional relation.

As explained above, the robot 20 in the embodiment includes the base (in this example, the base B), the movable section (in this example, the movable section A) provided on the base, the driving section (in this example, the first to fourth driving sections M1 to M4) configured to drive the movable section, the connecting section (in this example, the connecting section CN) to which at least a part of the first wire (in this example, the first wire CA1) of the other device (in this example, the robot control device 30) is connected, and the second wire (in this example, the second wire CA2) configured to connect the driving section and the connecting section. The base includes the cover section (in this example, the cover section CV) through which the first wire is inserted, the cover section covering at least a part of the opening section (in this example, the opening section RH) of the base. The cover section includes the cutout section (in this example, the cutout sections CO1 to CO4) capable of detaching the cover section from the base by sliding in the direction (in this example, the first direction) crossing the direction in which the first wire is inserted through the cover section. Consequently, the robot 20 can cause the user to easily detach the cover section and can prevent a deficiency from occurring in at least one of the connecting section and the second wire.

The robot 20 includes the housing section (in this example, the housing section R) to which the connecting section is fixed and that includes the opening section. Consequently, the robot 20 can prevent, with the housing section to which the connecting section is fixed and that includes the opening section, a deficiency from occurring at least in one of the connecting section and the second wire.

In the robot 20, the center axis of the fastening member fastening the ground terminal (in this example, the ground terminal GE) of the second wire and the housing section is located further on the outer side than the inside of the housing section. Consequently, the robot 20 can prevent the fastening member fastening the ground terminal of the second wire and the housing section from coming into contact with another object on the inside of the housing.

In the robot 20, the cover section includes the cutout section capable of detaching the cover section from the base in the state in which the fastening member (in this example, the fastening member SC) fastening the cover section and the base is loosened. Consequently, the robot 20 can cause the user to easily detach the cover section. As a result, the robot 20 can reduce a time required for work for detaching the cover section from the base.

In the robot 20, the first axis (in this example, the first axis CL1) determined according to the insert-through hole (in this example, the insert-through hole CH), which is formed in the cover section and through which the first wire is inserted, and parallel to the insert-through direction in which the first wire is inserted through the cover section and the second axis (in this example, the second axis CL2) determined according to the connecting section and parallel to the insert-through direction do not coincide with each other. Consequently, the robot 20 can make it easy to house an excess length of the first wire in the housing section.

In the robot 20, the first axis and the second axis do not coincide with each other in the range (in this example, the range RG) in which the first axis moves. Consequently, the robot 20 can prevent the sliding of the cover section from being hindered by a content of the housing section.

The robot 20 includes the base, the movable section provided on the base, the driving section configured to drive the movable section, the connecting section to which at least a part of the first wire of the robot control device (in this example, the robot control device 30) is connected, and the second wire configured to connect the driving section and the connecting section. The base includes the cover section through which the first wire is inserted, the cover section covering at least a part of the opening section of the base. The cover section includes the cutout section capable of detaching the cover section from the base by sliding in the direction crossing the direction in which the first wire is inserted through the cover section. Consequently, the robot 20 can prevent a deficiency from occurring in at least one of the connecting section to which at least a part of the first wire of the robot control device is connected and the second wire.

The embodiment of the invention is explained in detail above with reference to the drawings. However a specific configuration is not limited to the embodiment and may be, for example, changed, replaced, or deleted without departing from the spirit of the invention.

The entire disclosure of Japanese Patent Application No. 2017-174623, filed Sep. 12, 2017 is expressly incorporated by reference herein.

What is claimed is:

1. A robot comprising:
a base having a housing defining an internal space;
an arm provided on the base;
an actuator housed within the housing of the base and configured to drive the arm;
a connector to which at least a part of a first wire of another device is connected, the connector being housed within the housing of the base; and
a second wire configured to connect the actuator and the connector, wherein
the housing of the base defines a hole, and the base includes a cover through which the first wire is inserted, the cover covering at least a part of the hole of the base, and
the cover includes a cutout for detaching the cover from the housing of the base by, in a state in which a screw fastening the cover and the housing is loosened but not removed, sliding the cover in a first direction crossing a second direction in which the first wire is inserted through the cover.

2. The robot according to claim 1, wherein the connector is fixed to the housing.

3. The robot according to claim 2, wherein a center axis of a screw fastening a ground terminal of the second wire and the housing is located further on an outer side than an inside of the housing.

4. The robot according to claim 1, wherein a first axis determined according to an insert-through hole, which is formed in the cover and through which the first wire is inserted, and parallel to an insert-through direction in which the first wire is inserted through the cover and a second axis determined according to the connector and parallel to the insert-through direction do not coincide with each other.

5. The robot according to claim 4, wherein the first axis and the second axis do not coincide with each other in a range in which the first axis moves.

6. The robot according to claim 1, wherein the other device is a robot control device that controls the robot.

7. The robot according to claim 2, wherein the other device is a robot control device that controls the robot.

8. The robot according to claim 3, wherein the other device is a robot control device that controls the robot.

9. The robot according to claim 4, wherein the other device is a robot control device that controls the robot.

10. The robot according to claim 5, wherein the other device is a robot control device that controls the robot.

11. A robot system comprising:
a robot a base having a housing defining an internal space, an arm provided on the base, an actuator housed within the base and configured to drive the arm, a connector to which at least a part of a first wire of another device is connected, and a second wire configured to connect the actuator and the connector, the connector being housed within the housing of the base; and
a robot control device that controls the robot, wherein
the housing of the base defines a hole, and the base includes a cover through which the first wire is inserted, the cover covering at least a part of the hole of the base, and
the cover includes a cutout for detaching the cover from the housing of the base by, in a state in which a screw fastening the cover and the housing is loosened, sliding the cover in a first direction crossing a second direction in which the first wire is inserted through the cover.

12. The robot system according to claim 11, wherein the connector is fixed to the housing.

13. The robot system according to claim 12, wherein a center axis of a screw fastening a ground terminal of the second wire and the housing is located further on an outer side than an inside of the housing.

14. The robot system according to claim 11, wherein a first axis determined according to an insert-through hole, which is formed in the cover and through which the first wire is inserted, and parallel to an insert-through direction in which the first wire is inserted through the cover and a second axis determined according to the connector and parallel to the insert-through direction do not coincide with each other.

15. The robot system according to claim 14, wherein the first axis and the second axis do not coincide with each other in a range in which the first axis moves.

16. The robot system according to claim 11, wherein the other device is a robot control device that controls the robot.

17. The robot system according to claim 12, wherein the other device is a robot control device that controls the robot.

18. The robot system according to claim 13, wherein the other device is a robot control device that controls the robot.

19. The robot system according to claim 14, wherein the other device is a robot control device that controls the robot.

20. The robot system according to claim 15, wherein the other device is a robot control device that controls the robot.

* * * * *